June 18, 1957     A. BEKEY ET AL     2,796,542

DYNAMO-ELECTRIC MACHINE

Filed March 5, 1956     2 Sheets-Sheet 1

ANDREW BEKEY
HORACE M. ROBINSON
INVENTORS.

BY Flam and Flam

ATTORNEYS.

June 18, 1957  A. BEKEY ET AL  2,796,542
DYNAMO-ELECTRIC MACHINE
Filed March 5, 1956  2 Sheets-Sheet 2
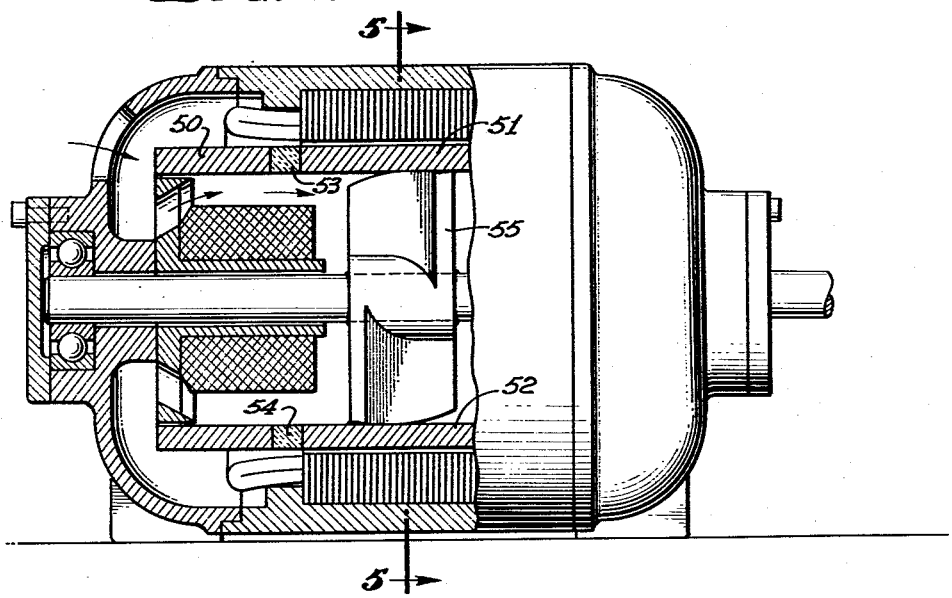
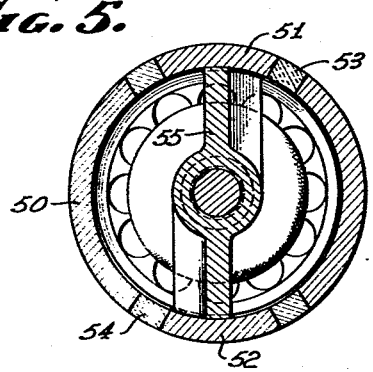
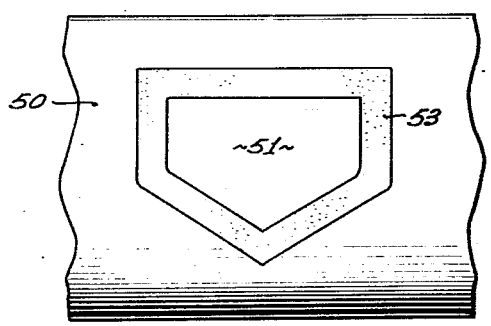
ANDREW BEKEY
HORACE M. ROBINSON
INVENTORS.
BY Flam and Flam
ATTORNEYS.

United States Patent Office 2,796,542
Patented June 18, 1957

2,796,542

DYNAMO-ELECTRIC MACHINE

Andrew Bekey and Horace M. Robinson,
Los Angeles, Calif.

Application March 5, 1956, Serial No. 569,443

14 Claims. (Cl. 310—162)

This invention relates to a dynamo-electric machine, and particularly to an alternator or synchronous motor.

One of the objects of this invention is to provide an alternator or synchronous motor of simple, light weight construction in which the use of brushes is obviated and in which all windings are stationary.

Another object of this invention is to provide a dynamo-electric machine in which the rotating parts are perfectly annular so that windage losses are minimized.

Still another object of this invention is to provide a brushless alternator utilizing novel magnetic parts located within the stator laminations, and in which a symmetrical arrangement of field coils ensures against any currents being induced in the casing structure.

Still another object of this invention is to provide a novel magnetic structure that can readily be designed to achieve appropriate output wave form when used as a generator.

Yet another object of this invention is to provide a novel short-circuited, conductive insert serving magnetically to isolate the included pole for purposes of defining an appropriate magnetic circuit, the insert also serving as a starting and damper winding. Conveniently, shaping of the included pole in a particular manner permits the conductive insert to be so shaped as to approximate herringbone-type configuration for uniformity and balance of starting torque.

Yet another object of this invention is to provide a novel brushless machine in which ventilation of the field windings is efficiently and easily accomplished without sacrifice of light weight construction.

Yet another object of this invention is to provide an asynchronous brushless motor, the speed of which may be regulated within limits by variations in the excitation of the direct current coils.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Fig. 4 is a longitudinal sectional view similar to Fig. 1, showing a modified form of the present invention;

Fig. 5 is a sectional view, taken along the plane indicated by line 5—5 of Fig. 4; and Fig. 6 is a fragmentary view showing a part of the rotating magnetic structure.

Figure 1:
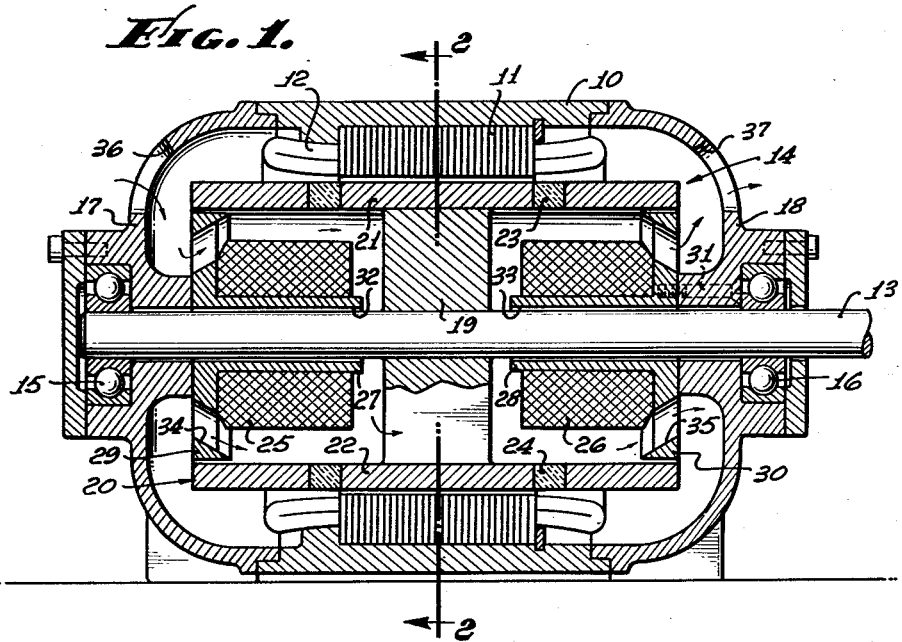
Figure 1 is a longitudinal sectional view of a dynamo-electric machine incorporating the present invention.
Figure 2:
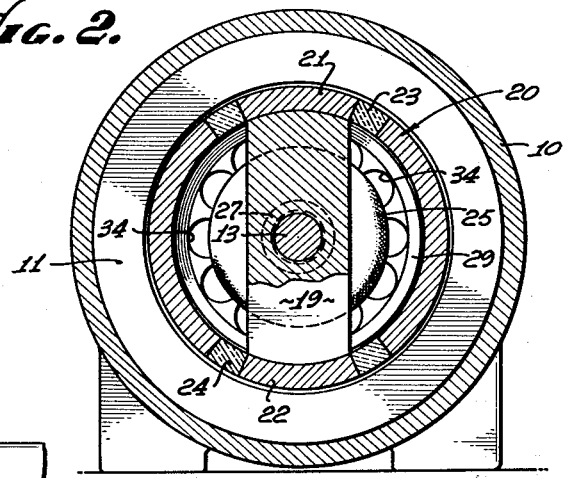
Fig. 2 is a sectional view, taken along the plane indicated by line 2—2 of Fig. 1.
Figure 3:
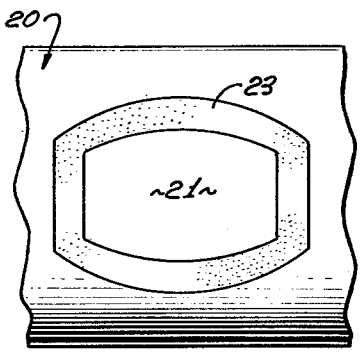
Fig. 3 is a fragmentary view showing a part of the rotating magnetic structure.

Referring to the form shown in Figs. 1 to 3, a motor casing 10 carries a stack of stator laminations 11 having slots in which appropriate stator windings 12 are accommodated. A shaft 13 carries a rotor structure generally designated at 14. The shaft is supported by the aid of roller bearings 15 and 16 seated in outwardly opening recesses of opposite end brackets 17 and 18.

Secured centrally of the shaft 13 is a magnetic spider 19 which, in turn, mounts a cylindrical field tube 20. The outer periphery of the field tube 20 has a slight clearance with the stator laminations 11 to form an air gap.

The tube 20 has two pole forming inserts 21 and 22 of magnetic material. The inserts 21 and 22 are formed as segments of a cylinder and their inner surfaces are in close press-fitting engagement with the arcuate end surfaces of the spider 19. Non-magnetic inserts 23 and 24 form part of the cylindrical field tube and magnetically isolate the pole forming inserts 21 and 22 from the remaining structure of the field tube.

For the purpose of setting up flux in the spider 19 and pole forming inserts 21 and 22, field coils 25 and 26 are provided. The field coils 25 and 26 are each mounted upon inwardly projecting tubular extensions 27 and 28 of yokes or cores 29 and 30, the tubular extensions having slight clearance with the shaft 13. The axes of the coils are in line with the shaft axis. The yokes 29 and 30 are mounted inwardly of the respective end brackets 17 and 18 by suitable means such as machine screws 31. The coils 25 and 26 set up flux lines in the yokes.

Flux is transferred across the small air gaps between the shaft 13 and the respective bores 32 and 33 of the yokes 29 and 30. The coils are so wound and so supplied with direct current that the fluxes produced in the shaft 13 at the spider 19 by the respective coils 25 and 26 axially oppose each other. The coils 25 and 26 cumulatively set up flux in the spider 19, the inserts 21 and 22 forming like poles. The non-magnetic insert 23, which may be of brass for example, confines the flux for passage into the stator laminations 11 across the small air gap between the inserts and the stator.

A return path to the rotating field tube 20 is provided by that portion of the field tube 20 outwardly beyond the pole forming inserts 21 and 22. The return flux path is illustrated most clearly in Fig. 2. The stator laminations 11 provide parallel paths to those portions of the field tube 20 located angularly between the pole forming inserts 21 and 22. The flux lines extend in both directions toward the ends of the tube 20. The flux paths are completed across the air gaps between the radial flanges of the yokes 29 and 30 and the inner end surfaces of the field tube. The annular peripheral portions of the flanges are spaced closely from the inner surface of the field tube at its ends to form a short air gap.

Between the shaft 13 and the tubular extensions 32 and 33 and between the ends of the field tube 20 and the annular surfaces of the yokes 29 and 30, flux is passed between a stationary and a rotating magnetic member. The magnetic and structural properties at these gaps are invariant with angular position. Accordingly, a transfer of flux across these air gaps is accomplished with a minimum of eddy current or hysteresis loss.

By virtue of the symmetrical use of two field coils 25 and 26, a given flux can be created in the polar inserts 21 and 22 with a minimum cross-sectional area of the shaft 13 and with a minimum size of the yokes 29 and 30. Accordingly, substantial savings in weight are achieved.

The tube 20 itself is supported centrally of the shaft 13 and presents a perfectly cylindrical surface. The light weight structure can thus be rotated efficiently at high speeds.

In a typical use of the machine as an alternator, the field windings 25 and 26 are energized and the shaft rotated by an external source of power. Alternating current energy is taken off from the stator windings 12 and the use of brushes is obviously avoided.

By the use of field coils 25 and 26 opposing each other, the magnetic condition of the ends of the shaft 13 at the bearings 15 and 16 is identical. There is no tendency, therefore, for currents to be created in the casing structure 11, 17, 18.

The non-magnetic insert 23 forms the equivalent of a squirrel cage winding for starting the machine as an induction motor. The insert 23 also operates to minimize flux pulsations due, for instance, to asymmetrical loading of the stator phase windings.

When operating as a motor, a slow application of a small amount of direct current to the windings 25 and 26 has been found actually to increase the slip of the machine. However, if the direct current energization is too large or the application of the direct current sudden, there will be a tendency for the machine to synchronize. It has been found that an increasing slip can be achieved by an increasing direct current excitation up to approximately fifty percent of normal excitation. Utilizing the direct current field coils for speed regulation is somewhat equivalent to increasing the resistance of a wound rotor in an induction type machine. This novel control is believed to be made possible by virtue of the geometric relationship of the pole inserts 21 and 22 to the remaining tube structure, as well as the conductive properties of the field tube and the non-magnetic insert 23.

The saving in coil material is accomplished by virtue of the fact that the field coils 25 and 26 may be easily axially extended in this organization of structure. Thus, the diameter of the turns is, on the average, small. Also, this feature promotes efficient cooling of the coils by providing an increased area through which the cooling air may pass. The cooling path is provided by a series of openings 34 and 35 in the flanges of the respective yokes 29 and 30. Air enters, as indicated by the arrows, through openings 36 and 37 in the brackets 17 and 18 and passes axially through the ports 34 and 35 over the field windings 25 and 26. The segmental open spaces between the tube 20 and the web 19 provide axial passage of cooling air.

The form shown in Figs. 4, 5 and 6 is similar to the form shown in Figs. 1, 2 and 3.

In the present instance, the rotary field tube 50 has magnetic pole forming inserts 51 and 52 shaped as shown in Fig. 6 to provide an appropriate flux distribution in the air gap and, accordingly, a desired output wave form of minimum harmonic content. One side of each insert symmetrically tapers in a peripheral direction, bringing about an increased reluctance as compared with the more rectangularly shaped insert as shown in Fig. 3. This structural organization is essentially equivalent to shaping the edges of the pole face of the usual alternator to increase the air gap. The non-magnetic inserts 53 and 54 follow the configuration of the pole forming inserts 51 and 52 and provide an appropriate herringbone twist as in common induction motor construction, for similar purposes.

In the present instance, the central web 55 is formed as a fan blade, as shown most clearly in Figs. 4 and 5. Conveniently, air is caused to flow axially through the motor structure in one direction without requiring any additional fan structure. A material saving in size and weight is thereby accomplished.

In both forms the central web 19 or 55 may have as many pole sets as are necessary. In both instances a four-pole machine is illustrated, but it is understood that as many poles may be provided as is desirable.

The inventors claim:

1. In a dynamo-electric machine: a stator structure; a tubular magnetic member rotatable within said structure; circuitous electrically conductive means substantially magnetically isolating a portion of said member from the remainder of the member; said conductive means being spaced inwardly from the ends of the member whereby annular ends of the member have uniform magnetic properties; means forming a magnetic circuit with the tubular member, including a pair of non-rotary magnetic elements respectively cooperating with opposite ends of the member and with the isolated portion; and stationary coil means disposed around the axis of the magnetic member.

2. In a dynamo-electric machine: a stator structure; a pair of non-rotary magnetic core members; a shaft in magnetic path forming relationship with the core members at axially spaced portions of the shaft; a tubular member mounted on the shaft, and having a pole forming member; means forming a magnetic path between the pole member and the shaft at a place between the core members; the tubular member having annular ends in magnetic path forming relationship with the core members; the tubular member forming an air gap with the stator structure; electrically conductive means magnetically isolating the pole member from the ends of the tubular member and forming a short-circuited ring; and means cooperable with the core members for cumulatively inducing magnetism in the pole member.

3. In a dynamo-electric machine: a stator structure; a rotor comprising a tubular member of magnetic material having a pole forming insert; an electrically conductive non-magnetic circuitous member forming a part of the tubular member and magnetically isolating said pole forming insert; said circuitous member being spaced inwardly from the ends of the tubular member whereby annular ends of the tubular member have uniform magnetic properties; the stator structure completing one leg of a magnetic circuit between the tubular member and the insert; and means in tandem completing another leg of a magnetic circuit between the ends of the tubular member and the insert.

4. In a dynamo-electric machine: a stator structure; a rotor comprising a tubular member of magnetic material having a pole forming insert; an electrically conductive non-magnetic circuitous member forming a part of the tubular member and magnetically isolating said pole forming insert; the insert having a peripherally tapering configuration, and the non-magnetic conductive member having a configuration paralleling the insert; the stator structure completing one leg of a magnetic circuit between the tubular member and the insert; and means completing another leg of a magnetic circuit between the tubular member and the insert.

5. In a dynamo-electric machine: a stator structure; a rotor comprising a tubular member of magnetic material having a pole forming insert; an electrically conductive non-magnetic circuitous member forming a part of the tubular member and magnetically isolating said pole forming insert; the insert having a configuration tapering symmetrically in one peripheral direction, and the non-magnetic conductive member having a configuration paralleling the insert; the stator structure completing one leg of a magnetic circuit between the tubular member and the insert; and means completing another leg of a magnetic circuit between the tubular member and the insert.

6. In a dynamo-electric machine: a stator structure; a rotor structure, comprising a shaft, a web affixed to the shaft, and a tubular member supported substantially centrally by the web; the shaft, web and tubular member being made of magnetic material; a pair of non-rotary core members through which opposite ends of the shaft extend in magnetic path forming relationship, the tubular member having annular portions in magnetic path forming relationship with the core members; coils for the core members and having peripheral portions spaced inwardly from the tubular member; and means magnetically isolating those portions of the tubular member in juxtaposed relationship with the web; the web having a configuration to induce axial passage of air through the spaces between the peripheral portions of the coils and the tubular member.

7. In a dynamo-electric machine: a shaft of magnetic material; a pair of non-rotary core members having bores through which spaced portions of the shaft extend, the core members having axial extensions; axially extended coils mounted on the extensions; a rotary tubular member of magnetic material extending in spaced exterior encompassing relationship with respect to the coils; a web supporting the rotary member and secured to the shaft between the cores; means magnetically isolating those portions of the tubular member in juxtaposed relationship with the web; the rotary member having annular portions in magnetic path forming relationship with the cores; and means establishing communication between the exterior surface of the coils and the ambient air; the web having a fan blade configuration for inducing axial flow of air past the coils and through the tubular member.

8. In a brushless dynamo-electric machine: a stator structure; a rotor having one magnetic pole part located centrally of the rotor and another magnetic pole part located angularly with respect to said one pole part and extended to opposite ends of the rotor axially beyond said one pole part; said pole parts being magnetically isolated at the rotor; means forming tandem magnetic paths between said one pole part and the respective ends of the rotor, including a pair of axially spaced non-rotary magnetic elements; and separate stationary coil means disposed about the magnetic elements; the stator providing a magnetic path between said one pole part and that portion of the other pole part located angularly with respect to said one pole part.

9. The combination as set forth in claim 8 in which a circuitous conductive element is provided at said one pole part for magnetically isolating said parts and for providing a coil.

10. The combination as set forth in claim 8 in which a shaft provides a magnetic path between said magnetic elements and said one pole part.

11. The combination as set forth in claim 8 in which a shaft provides a magnetic path between said magnetic elements and said pole part; in which said magnetic elements and said shaft together define cylindrically formed air gaps; and in which the ends of said other pole part extend annularly to define with said magnetic elements cylindrically formed air gaps.

12. In a brushless dynamo-electric machine: a stator structure; a shaft of magnetic material; a magnetic member carried by the shaft and having ends disposed diametrically of the shaft; a tubular rotor of magnetic material mounted centrally by the ends of said magnetic member for rotation about the axis of the shaft; the ends of said member being exposed peripherally of the rotor to form first pole faces; means magnetically isolating the member from the rotor whereby the portions angularly between the first pole faces form second pole faces; a pair of non-rotary magnetic elements forming tandem magnetic paths between the ends of said rotor and portions of said shaft on opposite sides of said member; and coils for the elements; the stator providing arcuately extending magnetic paths between the pole faces.

13. In a brushless dynamo-electric machine: a housing; a stator structure carried by the housing; a shaft capable of forming a link in a magnetic circuit; a rotor of magnetic material having annular ends and having a centrally located first pole magnetically isolated from the remaining portion of the rotor, the remaining portion of the rotor forming an opposite pole; means supporting the rotor on the shaft so that said part is in magnetic circuit relationship with said shaft; a pair of non-rotary members located at opposite ends of the rotor and each defining air gaps with the ends of the rotor, said non-rotary members having portions extending axially of the shaft and defining therewith radial air gaps; the stator providing an arcuate magnetic path between said poles; and the non-rotary members and the shaft providing tandem magnetic paths between said one pole and said rotor ends; said paths being independent of said casing; and coils disposed about the non-rotary members and acting symmetrically and in tandem, whereby ends of the shaft are of the same polarity.

14. In a brushless dynamo-electric machine: a stator structure; a rotor having one magnetic pole part located centrally of the rotor and another magnetic pole part located angularly with respect to said one pole part and extended to opposite ends of the rotor axially beyond said one pole part; said pole parts being magnetically isolated at the rotor; means forming tandem magnetic paths between said one pole part and the respective ends of the rotor, including a pair of axially spaced non-rotary magnetic elements having peripheral portions accommodated within the ends of the rotor; separate stationary coil means disposed about the magnetic elements and within the rotor for providing in tandem magneto motive force; the stator providing a magnetic path between said one pole part and that portion of the other pole part located angularly with respect to said one pole part; and a casing of light non-magnetic material mounting the stator and supporting said rotor.

References Cited in the file of this patent

UNITED STATES PATENTS

| 468,121 | Thomson | Feb. 2, 1892 |
| 1,237,682 | Neuland | Aug. 21, 1917 |
| 1,633,454 | Mills | June 21, 1927 |
| 2,372,453 | Sherman | Mar. 27, 1945 |

FOREIGN PATENTS

| 719,921 | Great Britain | Dec. 8, 1954 |